US005931073A

United States Patent [19]

Hoyer-Ellefsen

[11] Patent Number: 5,931,073

[45] Date of Patent: Aug. 3, 1999

[54] BEVEL ANGLE CONTROL ON TRANSLATORY SAW APPARATUS

[76] Inventor: Sigurd Hoyer-Ellefsen, 540 Kay Terrace, Boca Raton, Fla. 33432

[21] Appl. No.: 08/910,682

[22] Filed: Aug. 13, 1997

Related U.S. Application Data

[63] Continuation-in-part of application No. 08/556,433, Sep. 4, 1996, abandoned, which is a continuation-in-part of application No. 08/535,385, Aug. 28, 1995, abandoned.

[51] Int. Cl.[6] .............................. B23D 45/02; B27B 5/20

[52] U.S. Cl. .......................... 83/471.3; 83/473; 83/486.1; 83/522.18; 83/581

[58] Field of Search .................................. 83/471.3, 473, 83/486.1, 581, 520, 522.18

[56] References Cited

U.S. PATENT DOCUMENTS

| | | | |
|---|---|---|---|
| 2,007,563 | 7/1935 | De Koning . | |
| 2,343,243 | 3/1944 | Roemer | 83/486.1 |
| 3,302,669 | 2/1967 | Edler . | |
| 4,152,961 | 5/1979 | Batson | 83/471.3 |
| 4,257,297 | 3/1981 | Nidbella | 83/478 X |
| 4,385,539 | 5/1983 | Meyerhoefer et al. | 83/473 |
| 4,599,927 | 7/1986 | Eccardt et al. | 83/477.2 X |
| 4,641,557 | 2/1987 | Steiner et al. | 83/471.3 X |
| 4,784,192 | 11/1988 | Raggiotti | 83/471.3 X |
| 5,265,510 | 11/1993 | Hoyer-Ellefsen | 83/471.3 |
| 5,404,779 | 4/1995 | Break | 83/473 X |
| 5,438,899 | 8/1995 | Hoyer-Ellefsen | 83/471.3 |

*Primary Examiner*—Eugenia A. Jones
*Attorney, Agent, or Firm*—Alvin S. Blum

[57] ABSTRACT

A radial arm saw apparatus is provided with a bevel angle adjustment used in combination with a miter angle adjustment. The saw motor is mounted on a rigid vertical mounting plate. The mounting plate is tiltably supported on a rigid vertical support panel that is connected to the translatory radial arm mechanism so that the motor tilt or bevel angle is adjustable. The connection between the mounting plate and the support panel includes an elongate linkage arm pivotally connected at one end to the mounting plate and at another end to the support panel. A horizontal guide pin fixed to the mounting plate extends through a curvilinear guide slot in the panel to operate in cooperation with the linkage arm to always maintain the bottom horizontal tangent of the saw blade in a common vertical plane regardless of the tilt or bevel angle of the motor. An automatic mechanism for maintaining the tangent at a preset elevation regardless of bevel angle is disclosed. In another embodiment, connection between the mounting plate and the support panel includes two horizontal guide pins that extend through, and cooperate with, circular guide slots to maintain the bottom horizontal tangent of the saw blade in the same position relative to the support panel regardless of the tilt or bevel angle of the motor. One or both pins or slots may be in either the mounting plate or the support panel.

15 Claims, 5 Drawing Sheets

BEVEL ANGLE CONTROL ON TRANSLATORY SAW APPARATUS

This is a continuation-in-part of U.S. patent application Ser. No. 08/556,433 filed Sep. 4, 1996, now abandoned, which is a continuation-in-part of Ser. No. 08/535,385 filed Aug. 28, 1995, now abandoned, incorporated herein by reference.

FIELD OF THE INVENTION

This invention relates to tool control systems and more particularly to systems for supporting and guiding rotating material working tools, such as radial arm saws, at bevel angles relative to a work piece.

BACKGROUND OF THE INVENTION

Radial arm saws generally have a horizontal support for the workpiece. The saw blade is mounted on a motor over the work support by a mechanism enabling horizontal translatory motion in an adjustably preset path. When the path is not at right angles to the long axis of the workpiece, it is called a miter cut. When the saw axis of rotation is tilted from the horizontal, the blade makes a bevel cut. A cut that is both bevel and miter is called a compound bevel out. For accurate operation, the user must be able to predict the precise path the saw blade will take through the workpiece.

In conventional radial arm saws, the rotatable saw blade, or other cutting tool mounted in place of the saw blade, is mounted in a yoke, carriage, track arm and column which cooperatively support the blade in different positions for cutting. The saw blade rotation axis and plane are offset from the central axis of the yoke. As a result, a number of difficulties and disadvantages are encountered in controlling the operating angles of the cut. There have been a number of patents issued for saw assemblies which cause the bevel angle or rotation of the saw axis about a horizontal axis to be better controlled. U.S. Pat. No. 3,302,669 issued Feb. 7, 1967 to Edler teaches a large arcuate support for the motor assembly. The center of the arc coincides with the bottom tangent of the blade edge so that movement of the motor assembly around the arc for bevel cuts always places the bottom of the saw kerf at the same position on the work surface. The disadvantages of this structure relate to the difficulties of accurately and securely supporting the weighty, vibrating motor assembly at selected points along the sliding arcuate support when great torque forces are applied during the cutting operation. U.S. Pat. No. 4,152,961 issued May 8, 1979 to Batson teaches pivoting of the entire radial arm assembly about a central pivot with a locking pin riding in an arcuate guide slot. Supporting the entire weight of the arm and motor assembly about a single pivot far away from the center of mass and torque inherently taxes the accuracy and rigidity of the entire system.

A system for predictably positioning the kerf location as the blade is tilted for bevel cutting. that will ensure secure and accurate support for the blade during bevel cutting would enhance the utility of radial arm saws and related apparatus.

SUMMARY OF THE INVENTION

It is accordingly an object of the invention to provide a support and control system for adjustment of the bevel angle of radial arm saws and the like apparatus that is inherently stable. It is another object of the invention to provide bevel control means which moves the least amount of structure for enhanced economy and efficiency. The system of the invention allows tilting of the motor housing and blade within a non-tilting support. As the motor housing is tilted to achieve a particular bevel angle, the horizontal tangent at the bottom of the blade does not move relative to the saw support and the workpiece support. This enables the operator to predict the position of the saw kerf in the workpiece and adjust the saw or workpiece as desired.

In a first embodiment, a combination of a pin in an arcuate slot and a pivotal linkage arm achieve position control such that the bottom horizontal tangent of the blade is maintained within a fixed vertical plane. The elevation of that tangent is then controlled by raising or lowering the support as required.

In an alternative embodiment of the invention, the bevel control mechanism no longer uses a pivoting linkage arm. It is replaced by a second pin in a second guide slot. The two guide pins move in separate guide slots. The guide slots are arcs of circles whose center is on the bottom horizontal tangent of the saw blade (BHT). The motor mounting includes a vertical motor plate. The support housing supporting the motor mounting has a support panel adjacent and parallel to the motor plate. The pins and slots are in either or both of the motor plate or the support panel and so arranged that the pins are horizontal and pass through the guide slots. Tilting of the motor moves the pins in the slots. That motion is limited by the slots so that the motor mounting is tilting about a center point that is on the BHT. The operator can more easily set up the workpiece for an accurate cut because the bottom of the kerf will not change position with change of bevel angle. After the bevel is adjusted, the tilt position is fixed by locking means well known in the art so as to prevent motion of the motor mount relative to the support panel during the cutting operation.

In one embodiment of the invention, the motor mounting includes two opposed parallel mounting plates and support panels for more symmetrical support and distribution of forces.

This assembly may be employed with a variety of reciprocal motion or radial arm saws such as that exemplified by U.S. Pat. No. 5,265,510 issued to the applicant and U.S. Pat. No. 2,007,563 issued to De Koning.

These and other objects, features and advantages of the invention will become more apparent when the detailed description is studied in conjunction with the drawings in which like reference characters indicate like elements in the various figures.

DETAILED DESCRIPTION OF PREFERRED EMBODIMENTS

Figure 1:
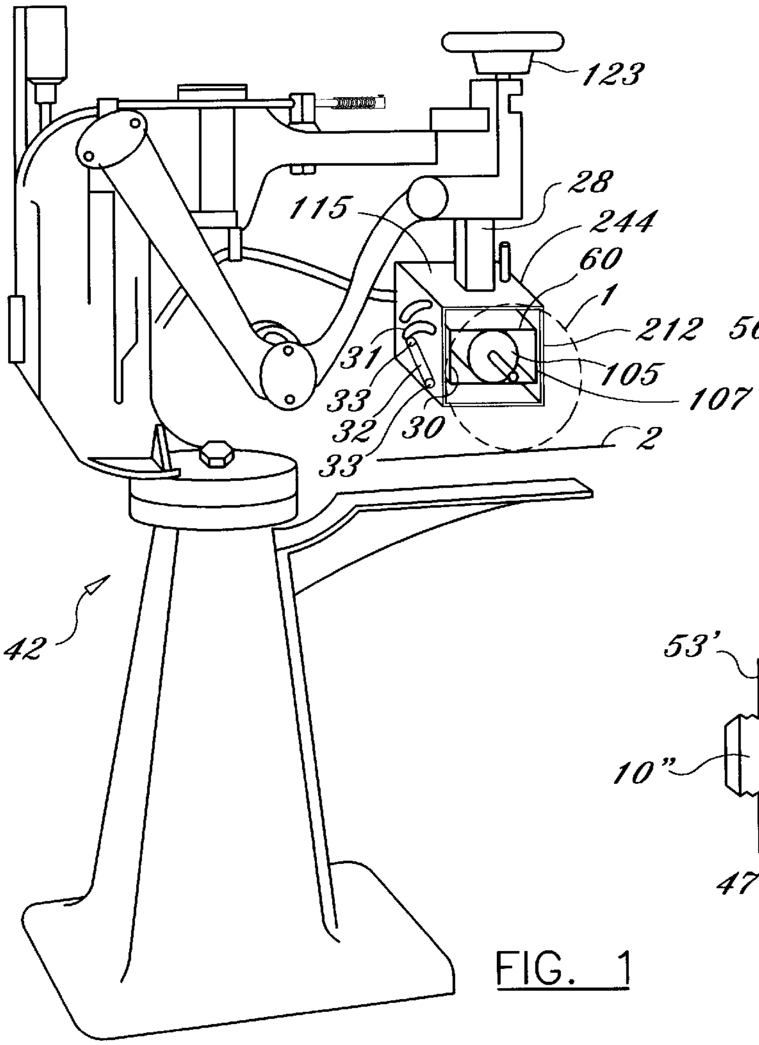
FIG. 1 is a perspective view of a radial arm saw with the manual bevel control system in place.
Figure 19:
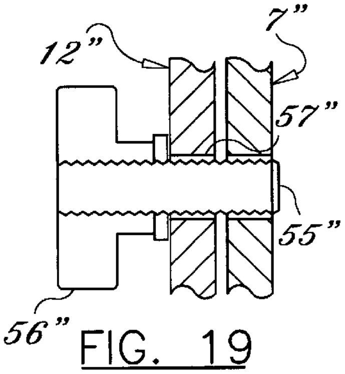
FIG. 19 is a sectional view taken through line 11—11 of FIG. 17.
Figure 20:
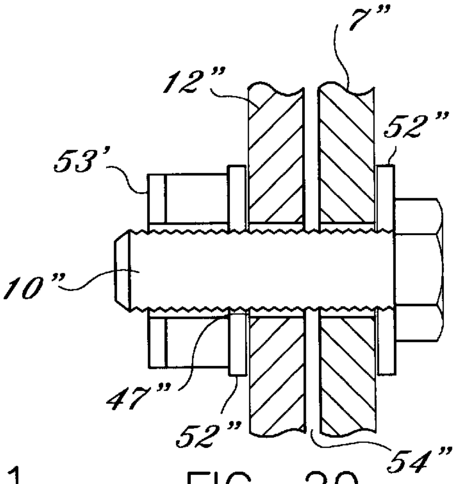
FIG. 20 is a sectional view taken through line 12—12 of FIG. 17.

Referring now first to FIGS. 2–9, a radial arm saw 43 of the type disclosed in Applicant's U.S. Pat. No. 5,438,899 issued Aug. 8, 1995 is shown. It employs a jointed support arm 38 which supports the entire weight of the saw assembly to ground and limits the saw motion to a preset horizontal plane. The elevation of that horizontal plane above the horizontal work support surface 24 is sensed by elevation sensor 28 and changed by elevation motor drive 23.

Figure 2:
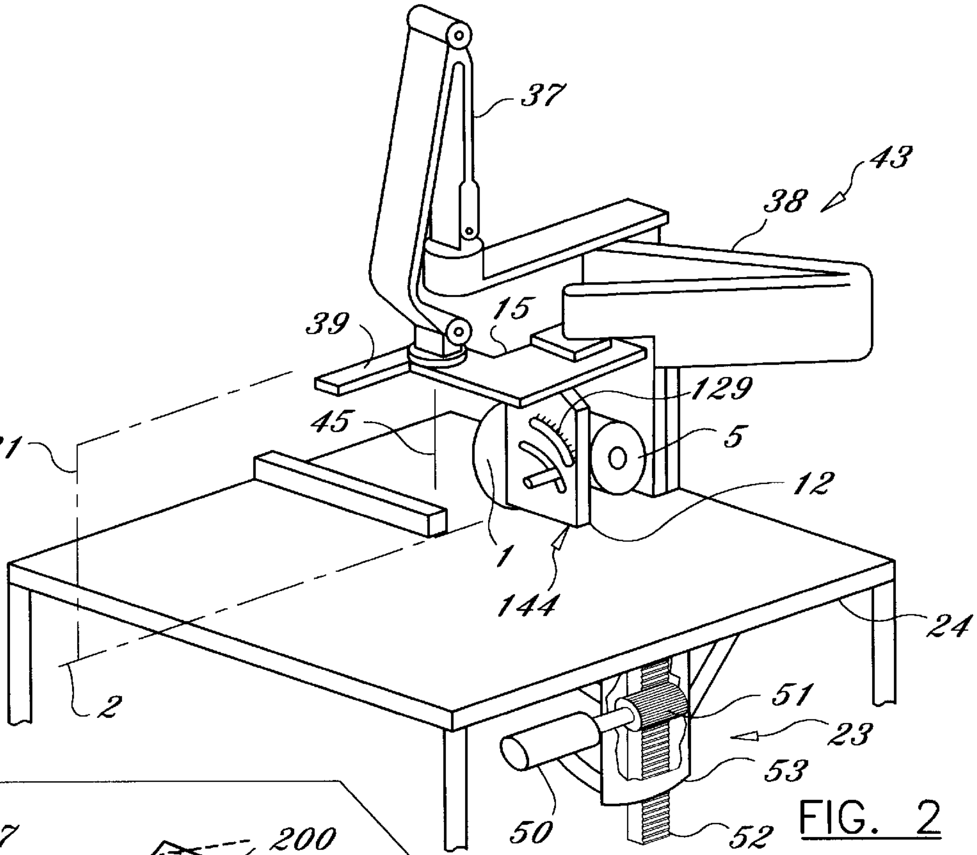
FIG. 2 is a perspective drawing of another radial arm saw with the bevel control system in place.

The elevation motor drive may be any of the drives well known in the art such as a motor drive replacing the handwheel of the helical screw drive 123 of FIG. 1. FIG. 2 illustrates an elevation motor drive 23 in which a tubular member 53 (shown partially cut away) is affixed to the underside of work support 24. An electric elevation motor 50 is affixed to member 53. The motor drives a pinion gear 51 which engages a rack 52 to raise and lower it as required. The guidance system including arms 37 and 38 are affixed to the rack 52 and are raised and lowered relative to support 24 by operation of the motor 50 in one direction or the other.

Figure 8:
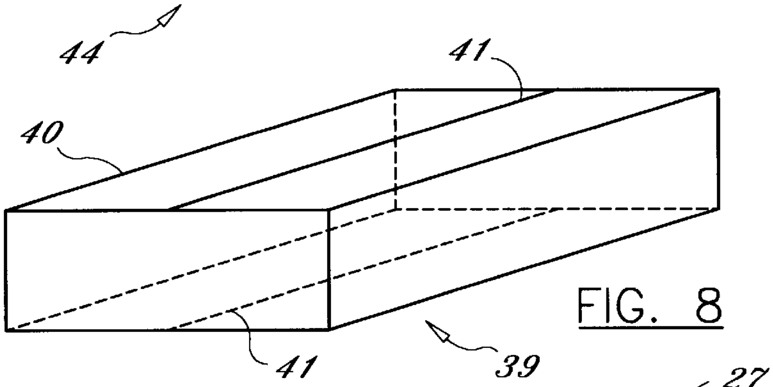
FIG. 8 is a perspective view of the sighting means.
Figure 9:
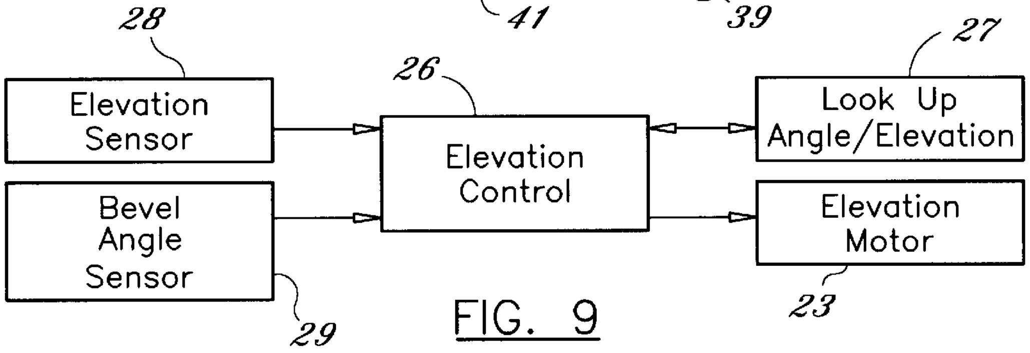
FIG. 9 is a block diagram of the automatic elevation mechanism.
Figure 12:
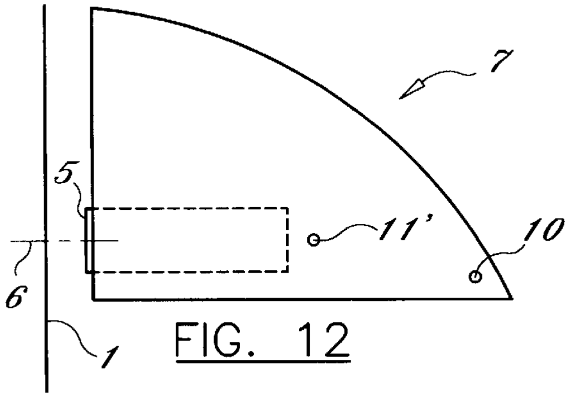
FIG. 12 is a front elevation view of the mounting plate of FIG. 11.
Figure 13:
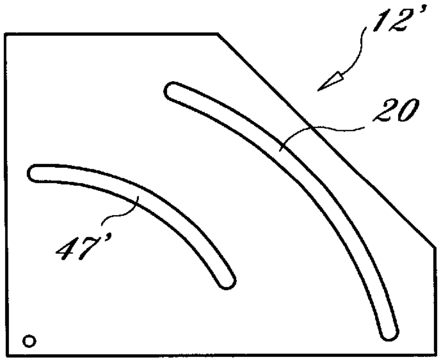
FIG. 13 is a front elevation view of the support panel of FIG. 11.
Figure 14:
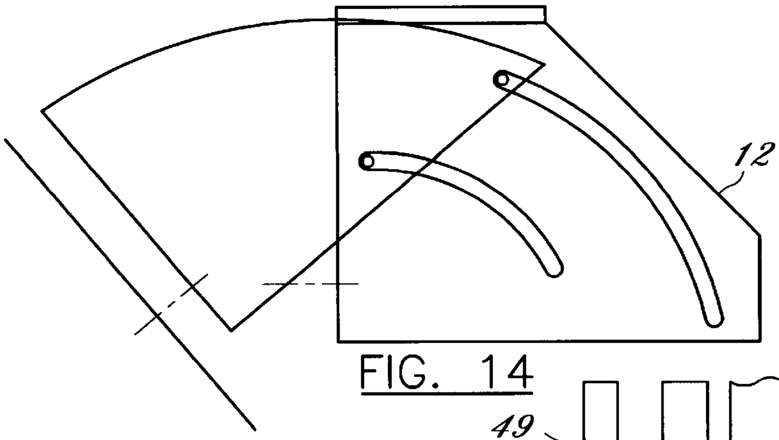
FIG. 14 is a front elevation view of the system of FIG. 11 set for a 45° cut.

The miter angle is controlled by jointed guide arm 37 which restricts saw motion to a to and fro motion in a vertical plane which is adjustable about the vertical pivot axis 45 to thereby adjust the miter angle. A retractable sighting means 39 permits the operator to look down onto the work surface and see an index line lying in that vertical plane. As best seen in FIG. 8, the sighting means 39 comprises a transparent bar 40 with scribed top and bottom black lines 41. By lining up the top and bottom lines visually, the operator will be looking down on the work support surface and the black line will be on the line that the bottom horizontal tangent 2 of the blade makes as it passes over the work support surface. This is the path that the bottom of the saw blade will take as it is drawn through the work piece.

In order to make a bevel cut, the motor 5 must be tilted so that the shaft 6 that drives the blade 1 is tilted from the horizontal. The bevel control system 44, FIGS. 3,6,7; 144, FIG. 2 and 244, FIG. 1 of the invention provides for tilting the motor to any desired angle and securing it at that position with a lock means, while always maintaining the bottom horizontal tangent of the blade in a vertical plane 21 predetermined by the miter angle adjustment.

Figure 3:
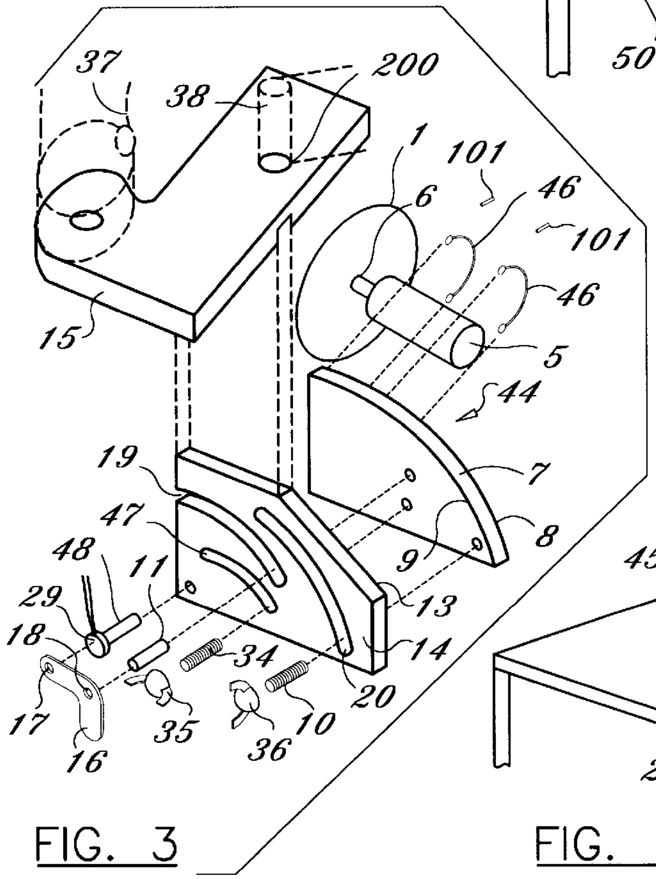
FIG. 3 is an exploded view of the bevel angle control system.
Figure 10:
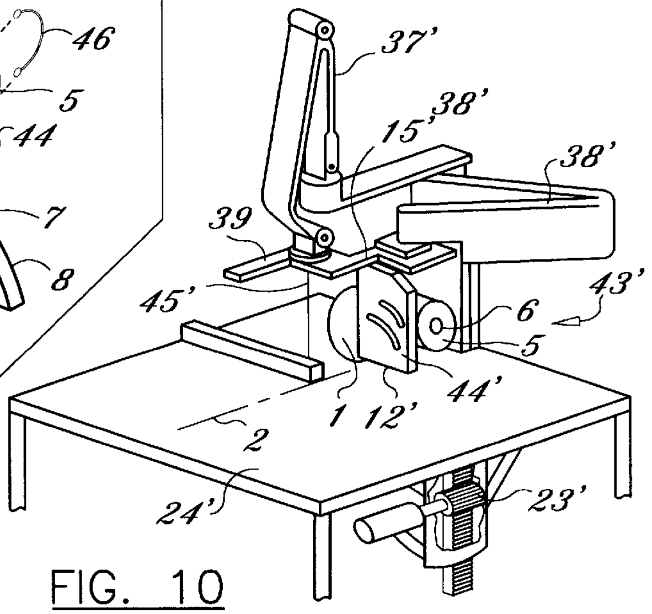
FIG. 10 is a perspective drawing of a radial arm saw with another embodiment of the bevel control system in place.
Figure 4:
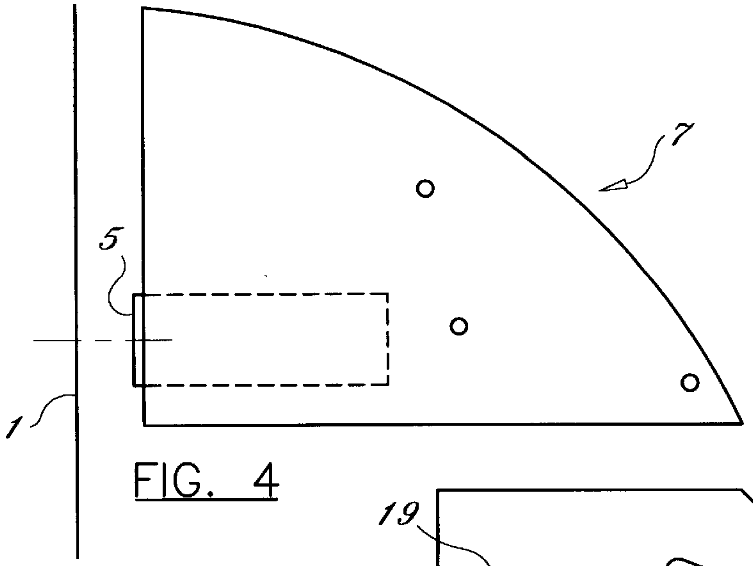
FIG. 4 is a front elevation view of the motor mounting plate with motor and blade.
Figure 5:
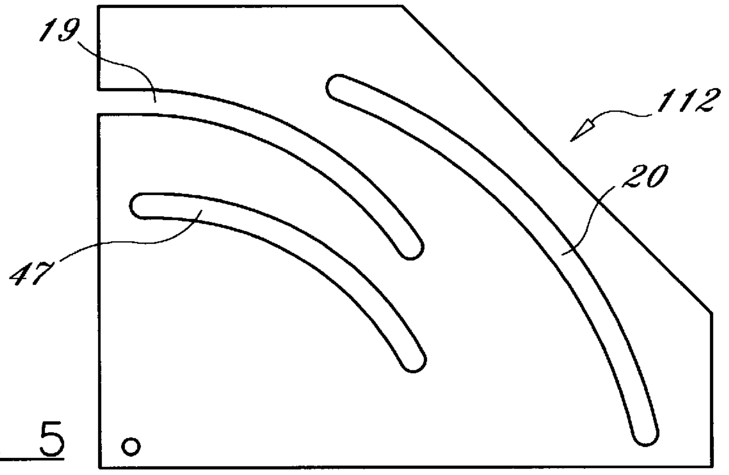
FIG. 5 is a front elevation view of the support panel.
Figure 6:
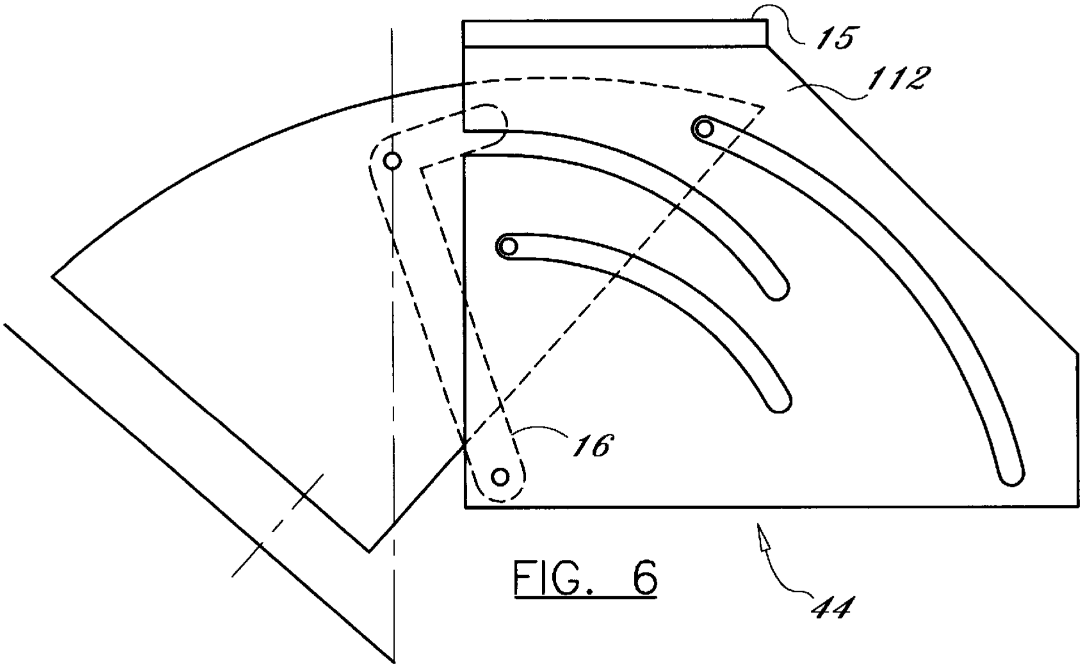
FIG. 6 is a front elevation view of the bevel control system set for a 45° bevel cut.
Figure 7:
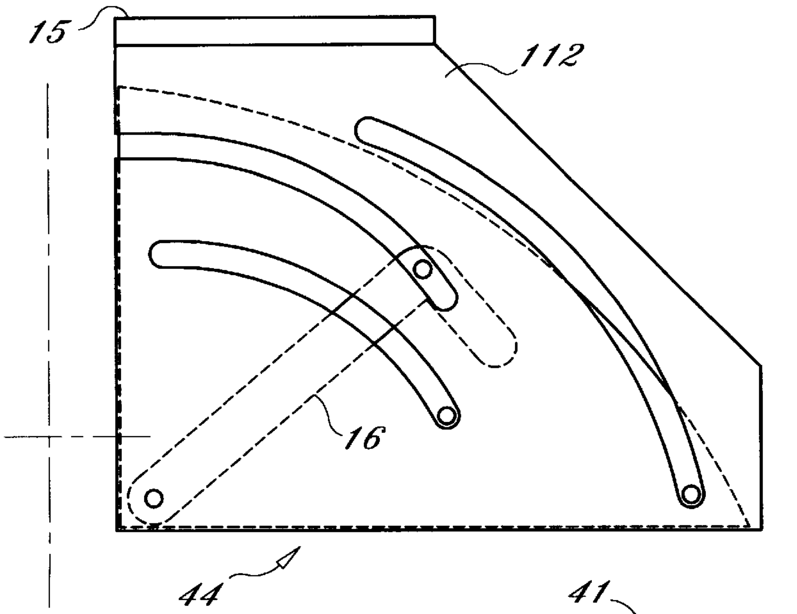
FIG. 7 is a front elevation view of the bevel control system set for a vertical cut.

The support arm 38 and the guide arm 37 are each separately connected to the support connection member 15. The first support panel 12 is fixed to connection member 15 at right angles in slot 200 by welding or other well known means. Electric motor 5 drives shaft 6 and blade 1. The motor 5 is clamped to the rear face 8 of motor mounting plate 7 by motor clamps 46 which straddle the cylindrical motor 5 and fasten to rear face 8 of mounting plate 7 by screws 101, welding or the like. The planar front face 9 of the mounting plate 7 is provided with a first or guide pin 10, a second pin 11, and a third, or locking pin 34, all extending horizontally. The mounting plate is mounted on the planar rear surface 13 of support panel 12 of FIG. 2, or 112 of FIGS. 3 and 5 such that pin 10 passes through curvilinear guide slot 20 with close tolerance, locking pin 34 passes through locking slot 47, and pin 11 passes through slot 19 of the panel. Both slots 47 and 19 allow free passage of their pins so that the slot walls do not control their pin positions. Pins 10 and 34 are threaded to receive wing nuts 36 and 35 so that the motor mounting plate may be pulled tightly against the rear surface 13 of the panel to lock a bevel position and frictionally prevent motion therebetween. As shown in FIG. 2 bevel angle may be visually provided by scribed visual indicator 129. Alternatively, an electrical bevel angle indicator 29 as shown in FIG. 3 may be provided, such as a digital rotary position indicator well known in the art, and the additional slot 47 and locking pin 34 may be provided. As shown, the electrical bevel indicator 29 is operatively connected between pin 48 fixed in first support panel 112 and movable linkage arm 16. The arm 16 is affixed to mounting plate 7 by pin 11 so that in effect relative movement between mounting plate 7 and first support panel 112 is sensed by bevel angle indicator 29, which is operatively connected therebetween.

An elongate linkage arm 16 has a first end 18 pivotally connected to the mounting plate by means of pin 11 and a second end 17 is pivotally connected to the front surface 14 of the panel by pin 48. When the lock means are released, and the motor plate is tilted for a bevel cut, the tangent 2 of the blade will gradually rise about 3/16 inch and then lower until at 45° it is about 1 inch below the elevation found when the blade is vertical. The elevation may then be corrected manually as indicated by an exemplary manual elevation operator 123 of FIG. 1. These values applied with a 10 inch diameter blade and a linkage arm that was 7 inches between pivot centers. An automatic system for always maintaining the path of the bottom of the blade constant at any bevel angle is illustrated diagrammatically in FIG. 9.

An elevation control means 26 such as a microprocessor receives bevel angle signals from a bevel angle sensor 29 and elevation signals from elevation sensor 28. A look up table 27 stores correct elevation values for each bevel angle. The elevation control 26 actuates the elevation motor 23 to raise or lower the assembly 44 until the correct elevation is reached.

FIG. 1 shows another type of radial arm saw 42 as exemplified by U.S. Pat. No. 2,007,563 issued to De Koning in which the motor 105 is mounted in a box 60 with parallel mounting plates, a front plate 107 and a rear plate 30. The support connection 115 is provided with a front support panel 212 and a parallel rear support panel 31 with slots, pins and linkage arms in both so that the weight and forces are symmetrically distributed. Pins and linkage arm of front support panel 112 are not visible in this view, they would be similar to those of FIGS. 2–9 and would operate in like manner. Accessory linkage arm 32 and pins 33 of rear support panel 31 are shown. The rear support panel 31 does not have the locking feature of the front support panel 112, because it may not be necessary to lock at two points.

The lock or stop means may alternatively be any of the braking means well known in the art for preventing relative motion between parts such as a brake shoe and drum or disc and calipers.

Referring now to FIGS. 10–15, a radial arm saw 43' of the type disclosed in Applicant's U.S. Pat. No. 5,438,899 issued Aug. 8, 1995 is shown. It employs a jointed support arm 38' which supports the entire weight of the saw assembly to ground and limits the saw motion to a preset horizontal plane. The elevation of that horizontal plane above the horizontal work support surface 24' is changed by elevation motor drive 23'.

The miter angle is controlled by jointed guide arm 37' which restricts saw motion to a to and fro motion in a vertical plane which is adjustable about the vertical pivot axis 45' to thereby adjust the miter angle. A retractable sighting means 39 permits the operator to look down onto the work surface and see an index line lying in that vertical plane. This is the path that the bottom of the saw blade will take as it is drawn through the workpiece.

In order to make a bevel cut, the motor 5 must be tilted so that the shaft 6 that drives the blade 1 is tilted from the horizontal. The bevel control system 44' of the invention provides for tilting the motor to any desired angle and securing it at that position with a lock means, while always maintaining the BHT in a line 2 predetermined by the miter angle adjustment.

Figure 11:
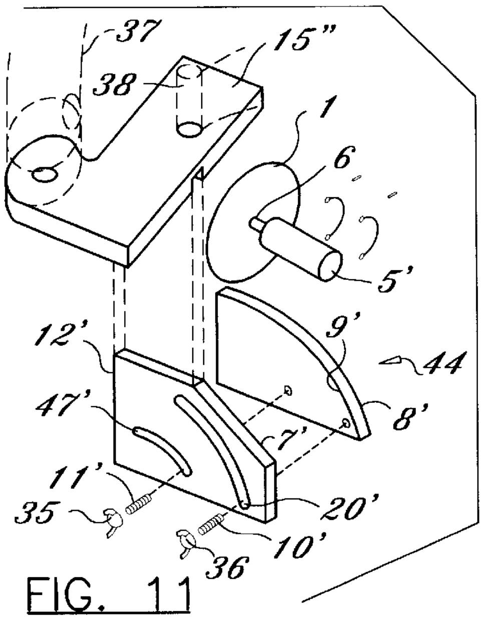
FIG. 11 is an exploded view of a bevel angle control system similar to that of FIG. 10.

The support arm 38' and the guide arm 37' are each separately connected to the support connection member 15'. The first support panel 12' is fixed to connection member 15'. Electric motor 5 drives shaft 6 and blade 1. The motor 5 is clamped to the rear face 8' of motor mounting plate 7' by motor clamps 46. The planar front face 9 of the mounting plate 7' is provided with a first guide pin 10', and a second guide pin 11' both extending horizontally. The mounting plate is mounted on the planar rear surface 13' of support panel 12' such that first guide pin 10' passes through circular guide slot 20' with close telerance, and second guide pin 11' passes through circular guide slot 47' of the panel 12' with close tolerance. As shown in FIG. 11, pins 10' and 11' are threaded to receive wing nuts 36' and 35' so that the motor mounting plate may be pulled tightly against the rear surface 13' of the panel to look a bevel position and frictionally prevent motion therebetween.

The stop means may alternatively be any of the braking means well known in the art for preventing relative motion between parts such as a brake shoe and drum or disc and calipers.

Figure 15:
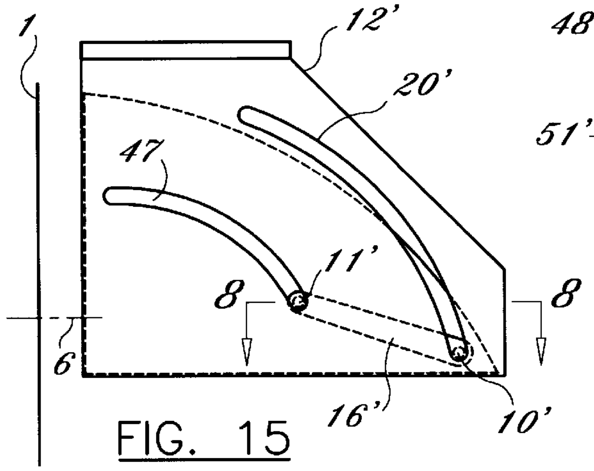
FIG. 15 is a front elevation view of the system of FIG. 11 set for a vertical cut.
Figure 16:
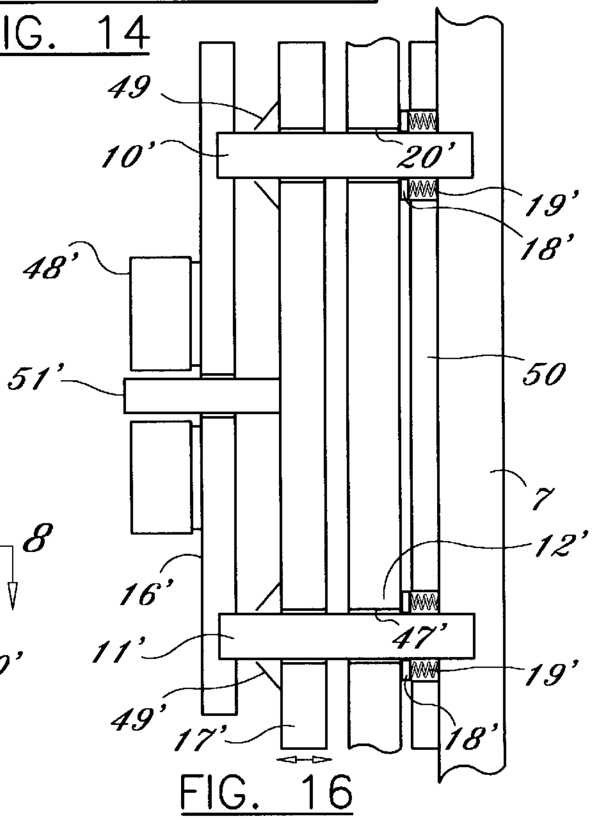
FIG. 16 is a sectional view, taken through line 8—8 of FIG. 15 showing an alternative locking means.
Figure 17:
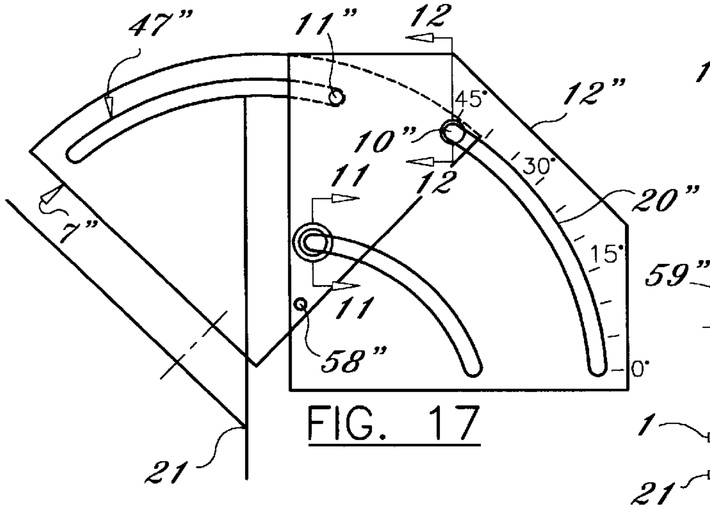
FIG. 17 is a front elevation view of another embodiment of the invention set for a 45° bevel cut.
Figure 18:
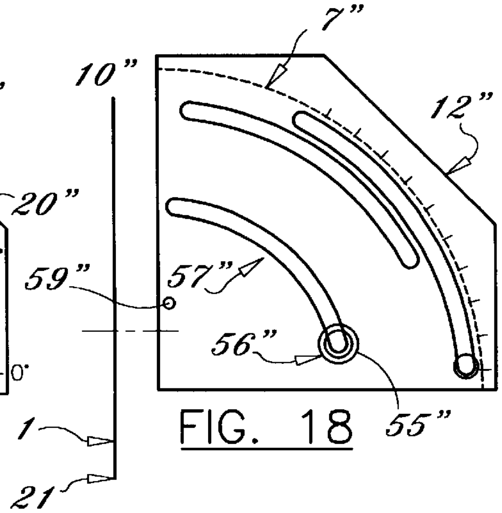
FIG. 18 is a front elevation view of the embodiment of FIG. 17 set for a vertical cut.

Referring now to FIGS. 15 and 16, an alternative braking or stop means is shown for preventing motion of the motor mounting relative to the support panel after the bevel adjustment has been made. The pins 10', 11' affixed to mounting plate 7 pass through slots 20', 47' in support panel 12' as in FIG. 14, The pins are joined together by pin connector bar 16'. Weak compression springs 19' hold plate 7 and panel 12' apart and lubricous washers 18' permit free sliding of the motor mount during bevel adjustment.

The locking means to prevent motion once the bevel angle has been set includes a locking bar 17' which is movably mounted on the pins 10', 11' between connecting bar 16' and support panel 12'. Short stroke, powerful Belleville spring washers 49' on the pins force the looking bar 17' against panel 12', pulling both pins outward and forcing the mounting plate against the panel. A high friction surface 50, such as cork may be provided to further enhance the braking effect. To overcome the braking action of locking bar 17' against the support panel 12' and mounting plate 7 against the panel during bevel adjustment, a solenoid 48' is affixed to the connecting bar 16' with an actuator 51' which, when energized, pulls the locking bar 17' away from the support panel while compressing springs 49'. This locking arrangement has the advantages that the locking forces are reproducible independent of the operator and the forces are distributed over a broad area.

Referring now to FIGS. 17–20, another embodiment of the invention is shown in which one guide pin 10" and guide slot 47" are in the mounting plate 7" and a second guide pin 11" and guide slot 20" are in the support panel 12". Both guide slots are arcs of circles whose center lies on the BHT so that at any bevel angle, the bottom of the saw kerf will always remain at the same point, as the pins slide in the guide slots. The guide pin for this embodiment is a headed bolt 10" secured with washers 52" and nut 53" so that a small clearance space 54" remains between plate and panel for free bevel adjustment motion. Locking is achieved by a locking pin 55" affixed to plate 7" and extending through looking slot 57" in the support panel. The locking knob 56", threadably engaging locking pin 55", is tightened down on the panel, drawing plate and panel tightly together and preventing motion therebetween. A pin 58" fitting in hole 59" may be used to further maintain an exact preset angle such as 45° for example.

Figure 21:
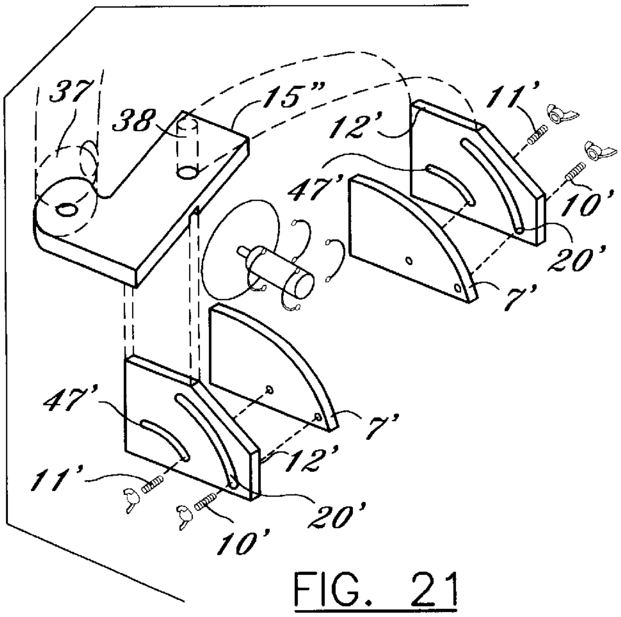
FIG. 21 is an exploded view of another embodiment of the bevel angle control system as in FIG. 11, but having double supporting and guiding elements.

Referring now to FIG. 21, an exploded view is shown of another embodiment of the bevel angle control system of the invention in which the BHT of the saw blade is maintained constant at all bevel angles by means of paired parallel motor mounting plates 7' attached to motor 5 and paired parallel vertical support panels 12' each attached to the support connection 15", as indicated by the phantom lines joining each panel 12' to support connection 15". Guide pins 10', 11' extend between the plates and panels at right angles and engage the slots 47', 20' as described for FIG. 11 to define the BHT of the blade. By supporting the motor symmetrically on two sides the forces are balanced for enhanced stability.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. In a rotary saw blade control system for use with a horizontal work support surface, a circular saw blade having a bottom horizontal tangent, a guidance system restricting saw motion to a fixed straight horizontal to and fro path over the work support surface, means for adjusting the fixed path by rotation about a fixed first vertical axis for miter angle adjustment, and the blade being rotatably mounted on a shaft driven by a motor, the improvement comprising:

(A) a first rigid vertical motor mounting plate having a rear face fixedly attached to said motor and a planar front face;

(B) a first rigid vertical support panel having opposed planar surfaces, a front surface and a rear surface, said rear surface being positioned adjacent said front face of said first mounting plate;

(C) a support connection means for operatively connecting said first support panel to the guidance system;

(D) a first guide pin affixed to one of said first mounting plate or said first support panel and extending horizontally to the other of said first mounting plate or said first support panel, and a first guide slot means for controlling motion of said first guide pin, said first guide slot means being in the other of said first mounting plate or said first support panel;

(E) a second guide pin affixed to one of said first mounting plate or said first support panel and extending horizontally to the other of said first mounting plate or said first support panel, and a second guide slot means for controlling motion of said second guide pin, said second guide slot means being in the other of said first mounting plate or said first support panel;

(F) said first and second guide slot means having a configuration of the arc of a circle whose center lies on the bottom horizontal tangent for maintaining a fixed position of said bottom horizontal tangent as the motor is tilted for a bevel cut; and (G) lock means for preventing the motion of said first mounting plate relative to said first support panel in a first mode of operation, and for permitting relative motion in a second mode of operation.

2. The system of claim 1, in which the lock means comprises an arcuate slot in said first support panel; a locking pin affixed to said first mounting plate and extending horizontally through said arcuate slot; and clamping means attached to said locking pin for forcing said first support panel and said first mounting plate frictionally together in the first mode of operation.

3. The system according to claim 2, in which said first guide pin and said second guide slot means are in said first mounting plate and said second guide pin and said first guide slot means are in said first support panel.

4. The system according to claim 1, in which said first guide pin and said second guide slot means are in said first mounting plate and said second guide pin and said first guide slot means are in said first support panel.

5. The system according to claim 1, in which said first and second guide pins are affixed to said first mounting plate and said first and second guide slot means are in said first support panel.

6. The system according to claim 5, in which said lock means comprises a separate clamping element adjustably connected to each of said guide pins.

7. The system according to claim 5, in which said lock means comprises a connector joining said guide pins and spring bias means for forcing said first mounting plate and said first support panel together with preset force in said first mode of operation.

8. The system according to claim 7, further comprising means for releasing said spring bias means in said second mode of operation, said means for releasing connected to said connector.

9. The system according to claim 8, in which said means for releasing comprises a solenoid.

10. The system of claim 5, in which the lock means comprises an arcuate slot in said support panel; a locking pin affixed to said mounting plate and extending horizontally through said arcuate slot; and clamping means attached to said locking pin for forcing said support panel and said mounting plate frictionally together in the first mode of operation.

11. The system according to claim 1, further comprising:

(H) a second motor mounting plate parallel to the first mounting plate and spaced apart therefrom by the motor to which it is attached;

(I) a second supp6rt panel adjacent the second mounting plate fixedly connected to the support connection means;

(J) a third guide pin affixed to one of said second mounting plate or said second support panel and extending horizontally to the other of said second mounting plate or said second support panel, and a third guide slot means in the other of said second mounting plate or said second support panel for controlling motion of said third guide pin;

(K) a fourth guide pin affixed to one of said second mounting plate or said second support panel and extending horizontally to the other of said second mounting plate or said second support panel, and a fourth guide slot means in the other of said second mounting plate or said second support panel for controlling motion of said fourth guide pin; and (L) said third and fourth guide slot means having a configuration of the arc of a circle whose center lies on the bottom horizontal tangent for maintaining a fixed position of said bottom horizontal tangent as the motor is tilted for a bevel cut.

12. In a rotary saw blade control system for use with a horizontal work support surface, a circular saw blade having a bottom horizontal tangent, a guidance system restricting saw motion to a fixed straight horizontal to and fro path over the work support surface, means for adjusting the fixed path by rotation about a fixed first vertical axis for miter angle adjustment, and the blade being rotatably mounted on a shaft driven by a motor, the improvement comprising:

a first rigid vertical motor mounting plate having a rear face fixedly attached to said motor and a planar front face having extending horizontally therefrom a first pin and a second pin spaced apart from one another, said blade being affixed to said shaft and said shaft being rotatably connected to said motor;

a first rigid vertical support panel having opposed planar surfaces, a front surface and a rear surface, the rear surface being positioned adjacent the front face of the first mounting plate;

a support connection means for operatively connecting the first support panel to the guidance system;

an elongate rigid linkage arm having a first end and a second end, the first end being pivotally attached to the front surface of the first panel and the second end being pivotally attached to the front face of the first plate by means of the second pin;

a first curvilinear slot means extending between the front and rear surfaces of the first support panel for permitting free movement therethrough of the second pin;

a second curvilinear slot means extending between the front and rear surfaces of the first support panel for passage of the first pin therethrough with a close tolerance clearance to guide the movement of the first plate in cooperation with the action of the linkage arm to always maintain the bottom horizontal tangent within a plane perpendicular to the work support surface; and lock means for fixing the relative motion of the mounting plate relative to the support panel in a first mode of operation, and for permitting relative motion therebetween in a second mode of operation for adjustment of the bevel angle.

13. The system according to claim 12, further comprising power operated elevation means for adjusting the elevation of the support panel relative to the work support surface, the elevation means operatively interconnected between said guidance system and said work support surface;

a bevel angle sensing means for sensing the shaft angle relative to the horizontal, the bevel angle sensing means operatively connected between the support panel and the motor mounting plate; and elevation control means interconnecting the elevation means and the bevel angle sensing means for automatically adjusting the blade elevation at any bevel angle such that the bottom horizontal tangent will always remain at a predetermined elevation regardless of bevel angle and in a predictable single line path that is constant for a particular miter angle.

14. The system according to claim 12, in which the guidance system comprises a jointed guide arm and a jointed support arm, the support connection means being separately connected to the guide arm and the support arm such that the support arm supports the weight of the motor and permits motion of the motor in only one defined horizontal plane and the guide arm permits motion in only one defined vertical plane.

15. In a rotary saw blade control system for use with a horizontal work support surface, a circular saw blade having a bottom horizontal tangent, a guidance system restricting saw motion to a fixed straight horizontal to and fro path over the work support surface, means for adjusting the fixed path by rotation about a fixed first vertical axis for miter angle adjustment, and the blade being rotatably mounted on a shaft driven by a motor, the improvement comprising:

(A) a first rigid vertical motor mounting plate having a rear face fixedly attached to said motor and a planar front face;

(B) a first rigid vertical support panel having opposed planar surfaces, a front surface and a rear surface, said rear surface being positioned adjacent said front face of said first mounting plate;

(C) a support connection means for operatively connecting said first support panel to the guidance system;

(D) a first guide pin affixed to one of said first mounting plate or said first support panel and extending horizontally to the other of said first mounting plate or said first support panel, and a first guide slot means for controlling motion of said first guide pin, said first guide slot means being in the other of said first mounting plate or said first support panel;.

(E) a second guide pin affixed to one of said first mounting plate or said first support panel and extending horizontally to the other of said first mounting plate or said first support panel, and an arcuate slot in one of said first mounting plate or said first support panel for allowing passage of said second guide pin therethrough;

(F) said first and second guide pins and said first guide slot means cooperating to maintain the bottom horizontal tangent within a common vertical plane at any bevel angle; and (G) lock means for fixing the motion of the mounting plate relative to the support panel in a first mode of operation, and for permitting relative motion therebetween in a second mode of operation for adjustment of bevel angle.

* * * * *